Figure 1:
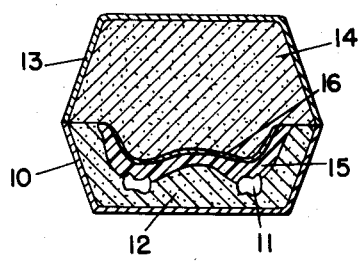

July 14, 1953  S. J. HETZEL  2,645,012
CUSHION LINING FOR DENTURES
Filed Nov. 28, 1950

*INVENTOR.*
STANFORD J. HETZEL
BY Robert O. Spindle
ATTORNEY

Patented July 14, 1953

2,645,012

UNITED STATES PATENT OFFICE 2,645,012

CUSHION LINING FOR DENTURES

Stanford J. Hetzel, Cheltenham, Pa.

Application November 28, 1950, Serial No. 197,890

11 Claims. (Cl. 32—2)

This invention relates to artificial dentures, and more particularly to cushion linings adapted for use between such dentures and the gum of a patient.

Artificial dentures, as exemplified by acrylic resin dentures, adapted to hold artificial teeth in proper relationship to the gum of a patient, are necessarily hard enough that they frequently require a cushion lining between the denture and the gum in order that the denture can be worn comfortably. There have been many proposals of materials to be used in making such linings, but few or none have been completely satisfactory. The characteristics which are essential to a satisfactory denture lining are so numerous that it is extremely difficult to find a material having all the necessary characteristics.

The necessary characteristics of a suitable denture lining include: non-toxicity; ability to be dyed to obtain a desired pink color; a closely controllable degree of softness at body temperature, so that the lining is soft enough to be comfortable but not soft enough to distort out of shape; ability to form a strong, permanent union with the denture base material, usually acrylic resin; ability to remain soft indefinitely under mouth conditions; and resistance to absorption of mouth secretions and food particles.

Denture linings comprising plasticized synthetic resin, e. g. methyl methacrylate resin, are known in the art. Such linings are unsatisfactory, however, for a variety of reasons, including the fact that such linings must often contain a high percentage of plasticizer, e. g. as much as 50 per cent by weight, in order to be suitably soft, and when linings contain such large percentages of plasticizer, there is a pronounced tendency for the lining to harden with the passage of time, probably through migration of plasticizer from the lining to the denture base.

I have discovered that denture linings comprising n-butyl methacrylate polymer meet exceptionally well all the requirements of suitable denture linings and overcome in remarkable fashion the disadvantages of prior are denture linings, such as those comprising plasticized methyl methacrylate polymer.

The present invention provides a novel lining or cushion comprising n-butyl methacrylate polymer shaped into conformity with the gum-engaging surface of the denture base, and adapted for use between the denture base and the gum of a patient. Denture linings according to the present invention are adapted to be strongly and permanently united with a denture base to form a unitary denture assembly comprising the denture base and the lining, fused together at their surface of contact. The denture base with which a denture lining according to the invention is used is preferably a suitable acrylic resin denture base material of the prior art, e. g. methyl methacrylate polymer and/or ethyl methacrylate polymer.

A denture lining according to the invention can comprise, if desired, plasticized n-butyl methacrylate polymer. It has been found that n-butyl methacrylate polymer can be plasticized to a suitable degree of softness and flexibility by incorporating with the polymer relatively small amounts of plasticizer, amounts which are small enough to substantially eliminate any tendency for the lining to harden with the passage of time through loss of plasticizer.

Alkyl phthalyl alkyl glycollates, each alkyl group having for example 1–5 carbon atoms, have been found to be, for the purposes of the present invention, particularly suitable plasticizers for n-butyl methacrylate polymer; however, other such non-toxic plasticizers can be also used. Combinations of plasticizers can be used. The amount of such plasticizer needed varies somewhat according to the nature of the plasticizer and the initial degree of softness, depending on the degree of polymerization of the butyl methacrylate polymer. According to the invention, plasticizers are generally used in amounts such that the total plasticizer content of the denture lining is about 5–20 weight percent, preferably 10–15, the latter percentages giving particularly good linings from the standpoint of degree of softness at body temperature. More than 20 weight percent is preferably not used, since such higher percentages introduce the danger of plasticizer migration from lining to denture base, and also tend to make the lining too soft; the lining should not be substantially softer than 40 on the instantaneous Shore hardness scale.

According to the present invention, denture linings can also be prepared by copolymerizing n-butyl methacrylate with an n-alkyl methacrylate having 5–15 carbon atoms in the alkyl group, in order to obtain a polymer having properties improved over those of n-butyl methacrylate homopolymers.

When denture linings comprising n-butyl methacrylate copolymerized with an n-alkyl methacrylate having 5–15 carbon atoms in the alkyl group are desired, any suitable method for obtaining such copolymerization can be used; n-butyl methacrylate and n-alkyl methacrylate having 5–15 carbons, preferably 6–10 carbons, in the alkyl group, both in monomer form or both in polymer form or one in polymer form and the other in monomer form, are admixed and treated in any manner suitable for converting the resulting mixture into a copolymer product. A major proportion, preferably 60–90 weight percent, of n-butyl methacrylate is used in the mixture.

The above-described plasticizers for admixture with n-butyl methacrylate polymers and the above-described alkyl methacrylates for copolymerization with n-butyl methacrylate can be considered to be non-toxic flexibilizing agents for n-butyl methacrylate polymers. The invention will be further described with reference to flexibilized n-butyl methacrylate polymer, since n-butyl methacrylate polymer in the absence of a flexibilizing agent is usually too hard and stiff to have optimum properties for use as a denture lining. However, the invention contemplates cases where a flexibilizing agent is not necessary, the polymer having suitable properties without it.

According to the present invention, a mixture of n-butyl methacrylate polymer and the desired flexibilizing agent is prepared, either by mixing together the polymer and flexibilizing agent, or by polymerizing with suitable known methods a mixture of n-butyl methacrylate monomer and the flexibilizing agent. The mixture of polymer and flexibilizing agent is preferably prepared in the form of a plastic sheet having the approximate thickness, e. g. 1/64 to 1/4 inch, desired in the denture linings to be prepared therefrom. Such sheets constitute stable, homogeneous mixtures of polymer and flexibilizing agent, and are adapted to be stored and transported, and to be shaped into conformity with the gum-engaging surface of a denture base and fused with the denture base during an operation for curing the latter.

Plastic sheets as described above can be conveniently prepared, for example, by mechanically mixing the proper proportions of n-butyl methacrylate polymer and flexibilizing agent, then heating the mixture in compression molding apparatus to a temperature sufficient to fuse the polymer, at the same time maintaining sufficient pressure on the mixture to prevent the formation of bubbles in the polymer. The desired thickness and other dimensions of the plastic sheet can be obtained, for example, by using molding apparatus having the desired dimensions.

In preparing denture assemblies according to the present invention, it is important that the denture base and lining materials be free of toxic impurities. Therefore, care should be taken to insure either that the denture base and lining polymers are prepared without using toxic materials, or if toxic materials are used in the preparation, that the product is purified to remove such toxic materials before using according to the present invention. Any suitable method can be used for preparing polymers in the absence of toxic materials, or for removing toxic materials from the polymer product.

The invention will be further described with reference to the attached sheet of drawing, which illustrates the manner in which plastic sheets as described above can be united with shaped denture-base-forming material and cured to give a unitary denture assembly having a cushion lining according to the invention.

In Figure 1 there is shown a lower dental flask section 10 containing artificial teeth 11 imbedded in plaster 12, and an upper dental flask section 13 containing plaster 14. Dental flask sections 10 and 13 have been prepared in such a way that, when joined as shown in Figure 1, plaster 12 and plaster 14 enclose a space in the shape of the desired denture assembly adjacent teeth 11. The method of preparing dental flask sections 10 and 13 can be any known method for accomplishing the above result, for example, the method disclosed in U. S. Patent 2,367,767 to E. H. Gale, issued January 23, 1945.

In Figure 1, there is also shown shaped denture base material 15 and spacer material 16, the latter being any suitable material such as metal foil. Denture base material 15 has been formed into the desired shape by joining dental flask sections 10 and 13 with spacer material 16 in place on dental flask section 13.

Figure 2:
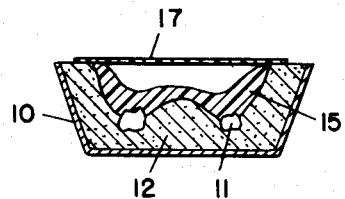

In Figure 2, there is shown lower dental flask section 10 containing shaped denture base material 15, after removal of upper flask section 13. Also shown in Figure 2 is denture lining material 17 in the form of a plastic sheet prepared as previously described. Denture lining material 17 is shown in position ready to be molded into conformity with the upper surface of shaped denture base material 15.

Figure 3:
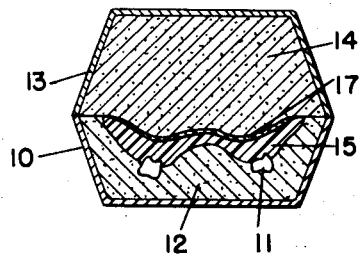

In Figure 3, there are shown joined dental flask sections 10 and 13. Lower dental flask section 10 contains shaped denture base material 15 and shaped denture lining material 17, the latter having been molded into conformity with the upper surface of shaped denture base material 17. The joined dental flask sections 10 and 13 are now ready to be subjected to a denture curing step as known in the art.

Figure 4:
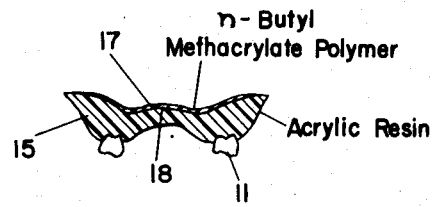

In Figure 4, there is shown the finished denture assembly product comprising teeth 11, acrylic resin denture base material 15, and denture lining material 17 comprising non-toxic flexibilized n-butyl methacrylate polymer. The base material 15 and lining material 17 have, by the curing step, been strongly and permanently united at their surface of contact 18.

It is to be understood that the method of preparation of the denture assembly, as indicated above, is subject to modification. Any suitable prior art method of preparing dentures can be used as the basis for preparing a denture assembly according to the present invention. The present invention contemplates such methods having the additional features, as described above in connection with the drawing, that space is provided for denture lining material to be inserted adjacent the gum-engaging surface of the denture base material, and that denture lining material according to the invention, preferably in the form of a plastic sheet, is inserted in the provided space before curing the denture.

The use as described above of thin thermoplastic sheets in making denture linings and fusing such linings with denture base material during the latter's curing operation is advantageous in a number of respects. The use of a sheet of known, substantially uniform thickness makes it possible, when pressing the sheet into conformity with the gum-engaging surface of the denture base material, to obtain a lining having more uniform thickness than can be obtained when using a putty-like material for similar purpose. The practice of shaping the lining in the dental flask before curing the denture base material, and then curing simultaneously the lining and the base is advantageous in that it produces unusually strong and permanent union between the base and lining. It is however, within the scope of the invention to fuse, in a separate step, the lining to a previously cured denture base.

The following examples illustrate the invention:

*Example I*

In this example, a denture base molding material was used comprising a putty-like mixture of about one part by volume of methacrylate monomer, identified by the trade-mark "Crystolex 102 Liquid" and comprising methyl methacrylate, and about 3.7 parts by volume of methacrylate polymer, identified by the trade-mark "Crystolex 102 Powder" and comprising methyl methacrylate polymer.

A denture lining molding material was used comprising flexibilized n-butyl methacrylate polymer in the form of a plastic sheet prepared as follows:

86 parts by weight of n-butyl methacrylate polymer, known commercially as "Du Pont n-butyl methacrylate polymer P-4" were ground with mortar and pestle, and 14 parts of butyl phthalyl butyl glycollate as plasticizer were added with stirring to form a doughy material which was then pressed into a mold and heated at 80° C. for two hours under elevated pressure to form a non-porous transparent plastic sheet having Shore hardness of about 74 and having brittle point of about 0° F.

Denture base molding material and denture lining molding material were formed into the desired shapes of denture base and denture lining respectively as shown in Figure 3, and the dental flask sections were then clamped together and immersed in a water bath at about 180° F. for about one hour, and then in boiling water for about 30 minutes.

The denture assembly prepared as described above comprised artificial teeth, a denture base comprising methyl methacrylate polymer, and a denture lining of n-butyl methacrylate polymer flexibilized with 14 weight per cent butyl phthalyl butyl glycollate.

The above denture assembly was found to have exceptionally good characteristics in all the various properties required of dentures having cushion liners. The base and lining of this denture assembly were firmly and permanently united at their surface of contact. By actual test in the mouth of a patient, it was found that the lining was soft enough to be worn with comfort on gums so sensitive that it had been extremely difficult to provide previously a denture that the patient could wear. In this test and others, it was found that, though soft, the lining of the present invention does not distort out of shape in the mouth. In actual tests, it was found that over periods of many months no tendency is exhibited for the lining to harden. Denture assemblies according to the present invention were further found in actual test to be non-toxic and to exhibit no tendency to absorb mouth secretions or food particles.

The results of the tests of denture assemblies as prepared in the above example show that denture assemblies having cushion linings of flexibilized n-butyl methacrylate polymer overcome in a remarkable fashion the disadvantages which make prior art denture linings, as exemplified by linings of plasticized methyl methacrylate polymer, unsuitable for actual use in the mouth.

*Example II*

In this example, a denture lining material was made by mixing together 75 parts by weight of Du Pont n-butyl methacrylate polymer P-4, 25 parts of n-hexyl methacrylate monomer, and a trace of benzoyl peroxide, and heating in a mold at about 75° C. for about two hours under elevated pressure. A plastic sheet was obtained substantially conforming, in appearance and flexibility, to the plastic sheet obtained in Example I.

This example shows that n-hexyl methacrylate can be used as flexibilizing agent in forming a plastic sheet of n-butyl methacrylate polymer, in this case butyl-hexyl methacrylate copolymer, having properties suitable for denture linings according to the present invention.

*Example III*

In this example, a denture lining material was made by substantially the same procedure as described in Example II, using n-octyl methacrylate monomer instead of n-hexyl methacrylate monomer. A plastic sheet was obtained substantially conforming, in appearance and flexibility, to the plastic sheet obtained in Example II.

This example shows that n-octyl methacrylate is a suitable flexibilizing agent for use according to the present invention.

*Example IV*

In this example, a denture lining material was made by substantially the same procedure as described in Example I, using ethyl phthalyl ethyl glycollate instead of butyl phthalyl butyl glycollate. A plastic sheet was obtained substantially conforming, in appearance and flexibility, to the plastic sheet obtained in Example I.

This example shows that ethyl phthalyl ethyl glycollate is a suitable flexibilizing agent for use according to the present invention.

Although, in the above examples, alkyl phthalyl alkyl glycollates and alkyl methacrylates have been given as examples of plasticizing constituents which can be used in denture linings according to the invention, similar results may be obtained when other non-toxic plasticizers for n-butyl methacrylate polymer are used, e. g. methyl abietate, castor oil, dioctyl phthalate, etc. Combinations of non-toxic plasticizers for n-butyl methacrylate polymer can be used if desired.

Furthermore, although in the examples flexibilizing agents of one kind and another were used in admixture with the particular n-butyl methacrylate polymer which was used, it is to be understood that with some n-butyl methacrylate polymers having different properties through different degrees of polymerization from those of the polymer used in the examples, the use of a flexibilizing agent is not necessary and can be dispensed with.

I claim:

1. A denture assembly comprising: a relatively hard acrylic resin denture base and a relatively soft cushion lining comprising n-butyl methacrylate polymer, said base and said lining being fused together at their surface of contact.

2. A denture assembly according to claim 1 wherein said lining comprises plasticized n-butyl methacrylate polymer.

3. A denture assembly according to claim 1 wherein said lining is plasticized with an alkyl phthalyl alkyl glycollate having 1-5 carbon atoms in each alkyl group.

4. A denture assembly according to claim 1 wherein said lining is plasticized with ethyl phthalyl ethyl glycollate.

5. A denture assembly according to claim 1 wherein said lining is plasticized with butyl phthalyl butyl glycollate.

6. A denture assembly according to claim 1 wherein said lining comprises n-butyl methacrylate copolymerized with an alkyl methacrylate having 5–15 carbon atoms in the alkyl group.

7. A denture assembly according to claim 1 wherein said lining comprises n-butyl methacrylate copolymerized with n-hexyl methacrylate.

8. A denture assembly according to claim 1 wherein said lining comprises n-butyl methacrylate copolymerized with n-octyl methacrylate.

9. In the preparation of artificial acrylic resin dentures by molding acrylic resin denture base forming material into the shape of a denture having a gum-engaging surface and curing the shaped denture base forming material, the improvement which comprises: applying to said gum-engaging surface, prior to said curing, a sheet of substantially uniform thickness comprising n-butyl methacrylate polymer, and shaping said sheet into conformity with said gum-engaging surface.

10. A denture assembly comprising: a relatively hard acrylic resin denture base comprising material selected from the group consisting of methyl methacrylate polymer and ethyl methacrylate polymer; and a relatively soft cushion lining comprising n-butyl methacrylate polymer, said base and said lining being fused together at their surface of contact.

11. A denture assembly comprising: a relatively hard acrylic resin denture base comprising a polymer selected from the group consisting of methyl methacrylate polymer and ethyl methacrylate polymer; and a relatively soft cushion lining comprising n-butyl methacrylate polymer and a flexibilizing agent, said base and said lining being fused together at their surface of contact.

STANFORD J. HETZEL.

References Cited in the file of this patent

UNITED STATES PATENTS

| Number | Name | Date |
|--------|------|------|
| 2,446,298 | Nelson | Aug. 3, 1948 |
| 2,558,139 | Knock | June 26, 1951 |

OTHER REFERENCES

"Methacrylate Resins," D. E. Strain et al., Industrial and Engineering Chemistry, April 1939, pp. 382–386.